Sept. 4, 1962 L. N. WILLIAMS 3,052,787
HEATED MIRROR
Filed Aug. 31, 1959
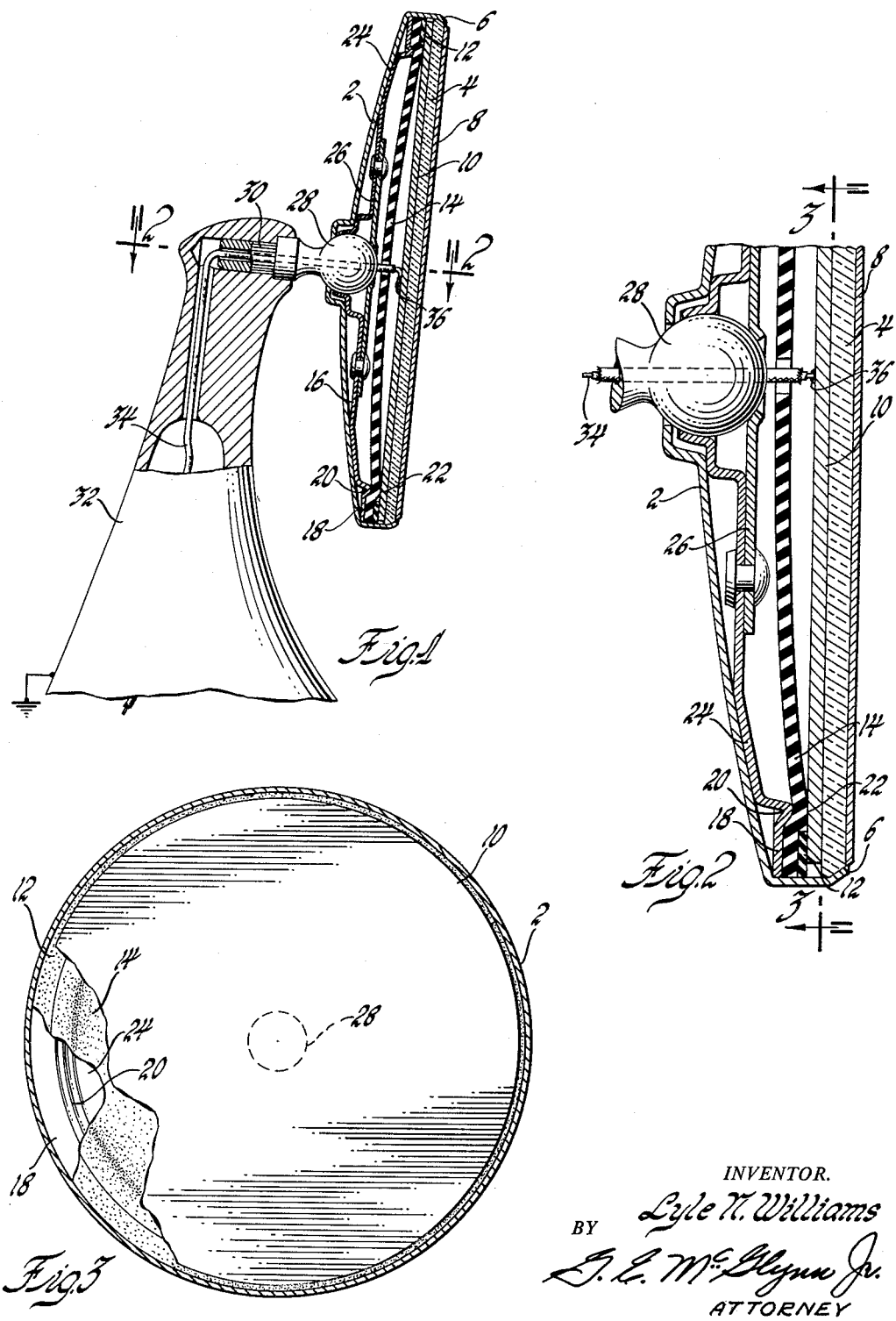
INVENTOR.
Lyle N. Williams
BY
G. E. McGlynn Jr.
ATTORNEY United States Patent Office 3,052,787
Patented Sept. 4, 1962

3,052,787
HEATED MIRROR
Lyle N. Williams, Anderson, Ind., assignor to General Motors Corporation, Detroit, Mich., a corporation of Delaware
Filed Aug. 31, 1959, Ser. No. 837,153
8 Claims. (Cl. 219—19)

The present invention relates to a heated mirror and, in particular, to such a mirror adapted to be mounted exteriorly of a vehicle passenger compartment and heated to prevent clouding, fogging, frosting and icing thereof during inclement weather.

Many attempts have been made to provide an outside rear view mirror which will not cloud, frost or the like regardless of weather conditions. The prior approaches to this problem have utilized heat radiation or connection currents for heating the mirror element or directly heating the mirror casing. Such prior art attempts to solve this problem have typically involved the use of an electrical resistance wire to supply the heat. An electrical resistance wire presents problems because it usually becomes brittle and oxidizes in use, and vehicle vibrations are quite often sufficient to break the wire resulting in failure of the mirror to heat. Also, oxidation of the wire in time causes burn-out and failure of the mirror heating units apart from the effects of vehicle vibrations.

It is, therefore, a principal object and feature of this invention to provide an improved heated mirror assembly which avoids the problems of resistance wire oxidation, burn-out and failure of the mirror to heat.

It is yet another object and feature of this invention to provide a heated mirror assembly including a heating plate in direct engagement with the mirror element so as to provide substantially uniform heating of the mirror element with a minimum current drain.

In general, these and other objects of this invention are attained in a heated mirror assembly comprising a metallic mirror body having an opening therein in which a mirror blank or element, of glass, plastic or the like, is adapted to be firmly secured with a reflective coating on the exposed surface thereof. A brass or other suitable metallic heating plate having an area substantially co-extensive with the mirror element is mounted contiguously with the surface of the mirror element within the mirror body, while an insulating gasket backs up only the periphery of the brass plate. Behind the insulating gasket there is positioned a disk of conductive rubber which is held in position against the insulating gasket by the peripheral flange of a metallic stiffener plate in engagement with the rear interior wall of the mirror body. Just inwardly of the peripheral flange of the stiffener plate there is provided suitable means such as a continuous rib to urge a portion of the conductive rubber gasket inwardly of the insulating basket into contact with the heating plate. Means is provided for passing a heating current through the heating plate and across the surface of the conductive rubber to the stiffener flange to ground to provide uniform mirror heating with a relatively small current drain.

The nature of the invention and the manner in which the foregoing objects are attained will become more apparent hereinafter as the description of the invention proceeds, and in which reference is made to the following drawings in which:

FIGURE 1 is a sectional view of a preferred embodiment of the invention;

FIGURE 2 is an enlarged fragmentary section taken on line 2—2 of FIGURE 1; and

FIGURE 3 is a section taken on line 3—3 of FIGURE 2.

In the drawings, there is shown a rear view mirror adapted to be mounted on a portion of a vehicle exteriorly of the passenger compartment, and comprising a generally circular metallic mirror body 2 having an opening in which the beveled periphery of the mirror element 4, made either of glass, plastic or some other suitably transparent material, is adapted to be secured by crimping of the periphery of the metal body as indicated at 6. In the particular embodiment shown, the mirror element 4 is of the first surface type in that a suitable reflective coating 8 is placed on the exposed or exterior surface of the mirror element. A relatively rigid circular heating plate 10 made of highly conductive metal such as brass is substantially co-extensive with the area or interior surface of the mirror element, although the periphery of the plate is spaced slightly inwardly from the periphery of the mirror body 2, and is mounted contiguously therewith. An annular gasket 12 of insulating material is disposed against or backs the periphery of the heating plate 10 opposite mirror element 4. A circular gasket 14 formed of electrically conductive rubber is mounted against the surface of the annular insulating gasket 12 opposite the heating plate, and is retained in this position by means of a circular stiffener plate 16 having an annular peripheral flange 18 abutting thereagainst. To insure that some portion of the conductive rubber gasket 14 is in electrical contact with plate 10, an annular rib 20 formed on the stiffener plate 16 just radially inwardly of flange 18 presses against the rubber gasket and forces an annular contact surface or portion 22 thereon into engagement with the heating plate.

An annular wall portion 24 of the stiffener plate abuts against the interior surface of the rear wall of the mirror body, and a socket plate 26 is suitably secured centrally of the stiffener plate according to conventional practice to form a socket embracing the ball member 28 mounted on a stud 30 threadably secured to the outer end of a metal mounting bracket 32 adapted to be secured to a vehicle to form an electrical ground connection for the heating circuit to be described. As is indicated in the drawings, the rear wall of the mirror body 2 is suitably apertured to receive the ball stud. Thus, the mirror assembly is universally pivotally supported upon the ball stud, while the stiffener plate 16 maintains the mirror components in proper assembled relationship to each other.

A conductor 34 suitably secured to an electrical power source, such as a vehicle battery, extends through passages in the metal bracket 32 and axially through the ball stud 30 for suitable electrical connection, as by soldering, to the center of heating plate 10 as indicated at 36.

The conductive rubber material of which the gasket 14 is composed is commercially well known and available. Essentially, such materials consist of conductive metal particles such as iron embedded within the rubber material in electrical contact with each other. It is significant to note that such conductive rubber gaskets conduct current across or along the surfaces thereof rather than through the material. A commercially preferred form of gasket material is silicone rubber which has a high heat resistance.

As set forth above, the embodiment shown in the drawings includes a mirror element coated with a reflecting material on its front surface. However, the rear surface can be coated with the reflective material particularly when this material is chrome or Inconel which retains its durability without any protective coating thereover such as paint which is usually required when silver or aluminum is used.

In the operation of the mirror, a heating circuit is made from the electrical power source through the conductor 34 and the components of the mirror assembly to the mirror body 2 and through the bracket 32 to ground. More specifically, the heating current travels through the heating plate 10 to the annular contact surface 22 on the conductive rubber gasket, across the peripheral surface of the rubber gasket resting against insulating gasket 12 and to ground. Inasmuch as the circular heating plate 10 is substantially co-extensive and contiguous with the interior surface of the mirror element 4, substantially uniform heat distribution over the mirror element results. The annular insulating gasket 12 establishes a current path across the conductive rubber gasket 14 or, in other words, insures a long enough path across the conductive rubber to impose a suitable resistance resulting in a small current drain. If the insulating gasket was not present, the current would take the easiest path through the heating plate 10 to the relatively thin edge of the conductive rubber gasket to ground. However, by interposing the annular insulating gasket 12 between the heating plate and rubber gasket, it is insured that the current must pass through a predetermined path equal to the radial dimension of the periphery of the conductive rubber gasket radially outward from the contact surface 22.

Therefore, it will be seen that the above invention results in a heated mirror assembly in which the heating plate 10 is in direct or contiguous contact with the interior surface of the mirror element 4 and is substantially co-extensive therewith to provide uniform heat distribution, while the cooperation of the annular insulating gasket 12 with the mirror element and conductive rubber gasket 14 results in a predetermined current path to minimize current drain. Moreover, the heating plate 10 is relatively rigid and durable as compared to resistance wire elements and, accordingly, is less susceptible to deterioration causing failure of the heating circuit.

While but one form of the invention has been selected for an illustration thereof, other forms will now be apparent to those skilled in the art. Therefore, the embodiment shown in the drawings is merely for illustrative purposes and is not intended to limit the scope of the invention which is defined by the claims which follow.

I claim:

1. A heated mirror assembly comprising a mirror body, a reflective mirror element mounted in said body, a rigid heating plate having a high thermal and electrical conductivity substantially co-extensive and contiguous with a surface of said mirror element interiorly of said body, said plate having a peripheral surface spaced from said mirror body, an insulating gasket seated against said peripheral surface of said plate opposite said mirror element, an electrically conductive resistance member seated against said insulating gasket and having a contact surface engaging said plate inwardly of said insulating gasket, and electrical circuit means for passing a heating current between said plate and body along said conductive resistance member.

2. A heated mirror assembly comprising a mirror body, a reflective mirror element mounted in said body, a rigid heating plate having a high thermal and electrical conductivity substantially co-extensive and contiguous with a surface of said mirror element interiorly of said body, said plate having a peripheral surface spaced slightly inwardly from said mirror body, an insulating gasket seated against said peripheral surface of said plate opposite said mirror element, an electrically conductive resistance gasket having a peripheral surface seated against said insulating gasket and an inner contact surface engaging said plate, and electrical circuit means for passing a heating current through said plate, contact surface and across the peripheral surface of said conductive gasket.

3. A heated mirror assembly comprising a mirror body, a reflective mirror element mounted in said body, a rigid heating plate having a high thermal and electrical conductivity substantially co-extensive and contiguous with the rear surface of said mirror element interiorly of said body, said plate having a peripheral surface spaced slightly inwardly from said mirror body, an insulating gasket backing the rearward face of said peripheral surface of said heating plate, an electrically conductive resistance gasket having a peripheral surface backing said insulating gasket and an inner contact surface engaging said plate, and electrical circuit means for passing a heating current between said plate and body along the peripheral surface of said conductive gasket.

4. A heated mirror assembly comprising a metallic mirror body having an opening therein, a mirror element mounted in the body opening, a rigid heating plate having a high thermal and electrical conductivity substantially co-extensive and contiguous with the surface of said mirror element interiorly of said body, said plate having a peripheral surface spaced slightly inwardly from said mirror body, an insulating gasket seated against said peripheral surface of said plate opposite said mirror element, a resistance gasket of electrically conductive rubber having its periphery resting against said insulating gasket and an inner contact portion thereof resting against said plate, a metallic mirror mounting member seated within and against said body and having a peripheral flange engaging the periphery of said rubber gasket opposite said insulating gasket, and electrical circuit means for conducting a heating current between said mirror body and said plate across the peripheral surface of the conductive rubber gasket.

5. A heated mirror assembly comprising a metallic mirror body having an opening therein, a mirror element mounted in the body opening and having a reflective coating on the exposed exterior surface thereof, a rigid heating plate having a high thermal and electrical conductivity substantially co-extensive and contiguous with the surface of said mirror element interiorly of said body, said plate having its periphery spaced slightly inwardly from said mirror body, an insulating gasket backing the interior face of said periphery of said plate, an electrically conductive rubber resistance gasket having a peripheral portion backing said insulating gasket and a contact portion inwardly thereof engaging said plate, a stiffener plate mounted in engagement with said body interiorly of the latter and having a peripheral flange resting against the peripheral portion of said rubber gasket, and electrical circuit means for passing a heating current through said heating plate to the contact and peripheral portions of said rubber gasket and to ground.

6. A heated mirror assembly comprising a circular metallic mirror body having an opening therein, a circular mirror element mounted in the body opening and having a reflective coating on the exposed exterior surface thereof, a circular rigid heating plate having a high thermal and electrical conductivity substantially co-extensive and contiguous with the surface of said mirror element interiorly of said body, said plate having a peripheral portion spaced slightly inwardly from said mirror body, an annular insulating gasket backing the interior face of said peripheral portion of said plate, a circular electrically conductive rubber resistance gasket having a peripheral portion backing against said insulating gasket and engaging said mirror body and a contact portion radially inwardly thereof engaging said plate, a stiffener plate mounted in engagement with said body interiorly of the latter and having a peripheral flange resting against the peripheral portion of said rubber gasket and an annular rib maintaining said contact portion in engagement with said plate, and electrical circuit means for passing a heating current through said heating plate to the contact and peripheral portions of said rubber gasket, to the mirror body and ground.

7. A heated mirror assembly comprising a mirror body, a reflective mirror element mounted in said body, a rigid heating plate having a high thermal and electrical conductivity substantially co-extensive and contiguous with a surface of said mirror element interiorly of said body, said plate having a peripheral surface spaced from said mirror body, an electrically conductive resistance member having a contact surface engaging said plate, and electrical circuit means for passing a heating current between said plate and body along said conductive resistance member.

8. A heated mirror assembly comprising a mirror body, a reflective mirror element mounted in said body, a rigid heating plate having a high thermal and electrical conductivity substantially co-extensive and contiguous with a surface of said mirror element interiorly of said body, said plate having a peripheral surface space from said mirror body, an electrically conductive resistance member having contact surfaces respectively engaging said plate and said body, and electrical circuit means for passing a heating current between said plate and body along said conductive resistance member.

References Cited in the file of this patent

UNITED STATES PATENTS

| | | |
|---|---|---|
| 1,098,436 | Hadaway | June 2, 1914 |
| 1,636,834 | Peters et al. | July 26, 1927 |
| 1,949,450 | Brown | Mar. 6, 1934 |
| 2,071,186 | Tofano | Feb. 16, 1937 |
| 2,110,660 | Doczekal | Mar. 8, 1938 |
| 2,461,315 | De Virgilis | Feb. 8, 1949 |
| 2,514,647 | Jolliffe | July 11, 1950 |
| 2,564,836 | Elsenheimer | Aug. 21, 1951 |
| 2,565,256 | Myers et al. | Aug. 21, 1951 |
| 2,588,825 | Goodman et al. | Mar. 11, 1952 |
| 2,648,754 | Lytle | Aug. 11, 1953 |
| 2,861,168 | Knoll | Nov. 18, 1958 |